United States Patent
Tibbe et al.

(10) Patent No.: US 12,161,256 B2
(45) Date of Patent: Dec. 10, 2024

(54) COFFEE MACHINE WITH INTEGRATED STEAM AND HOT WATER GENERATION

(71) Applicant: KONINKLIJKE PHILIPS N.V., Eindhoven (NL)

(72) Inventors: Tim Gerard Tibbe, Eindhoven (NL); Joeke Noordhuis, Eindhoven (NL); Gertrude Riëtte Bakker-Van Der Kamp, Eindhoven (NL); Klaas Kooijker, Eindhoven (NL); Gabriel Costa Eufrasio, Eindhoven (NL); Peter Tjeerdsma, Eindhoven (NL); Douwe Wijtsma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 847 days.

(21) Appl. No.: 17/414,045

(22) PCT Filed: Dec. 10, 2019

(86) PCT No.: PCT/EP2019/084304
§ 371 (c)(1),
(2) Date: Jun. 15, 2021

(87) PCT Pub. No.: WO2020/126630
PCT Pub. Date: Jun. 25, 2020

(65) Prior Publication Data
US 2022/0053969 A1    Feb. 24, 2022

(30) Foreign Application Priority Data
Dec. 17, 2018  (EP) .................................. 18212998

(51) Int. Cl.
*A47J 31/46*    (2006.01)
*A47J 31/36*    (2006.01)
(Continued)

(52) U.S. Cl.
CPC ............. *A47J 31/461* (2018.08); *A47J 31/36* (2013.01); *A47J 31/42* (2013.01); *A47J 31/4489* (2013.01); *A47J 31/468* (2018.08)

(58) Field of Classification Search
CPC ...... A47J 31/4489; A47J 31/42; A47J 31/461; A47J 31/468; A47J 31/36
(Continued)

(56) References Cited

U.S. PATENT DOCUMENTS

| | | | | |
|---|---|---|---|---|
| 2,014,325 | A * | 9/1935 | Grilli | A47J 31/3614 99/289 R |
| 10,687,658 | B2 * | 6/2020 | Fischer | A47J 31/4489 |
| 2003/0150333 | A1 * | 8/2003 | Fischer | A47J 31/54 99/279 |

FOREIGN PATENT DOCUMENTS

| | | |
|---|---|---|
| DE | 19545112 A1 | 6/1997 |
| EP | 0232460 A2 | 8/1987 |

(Continued)

OTHER PUBLICATIONS

Extended European Search Report issued in connection with corresponding EP Application No. 18212998.1 dated May 22, 2019.
(Continued)

*Primary Examiner* — Eric S Stapleton
(74) *Attorney, Agent, or Firm* — Maschoff Brennan (57) ABSTRACT

A coffee machine makes use of a valve arrangement for controlling the coupling of a water heater outlet selectively to one of two or more outlets, such as a steam delivery nozzle and a brew chamber. The valve arrangement comprises an active valve between the inlet channel and a first one of the outlets and a passive valve downstream of the active valve from the water heater outlet, coupled to a second one of the outlets. A cam surface controls the active valve, wherein the angular position of the cam surface controls the coupling of the inlet channel to the first one of
(Continued)

the outlets. The rotation may be driven by rotational coupling to a brew chamber motor. This coffee machine design makes use of a single valve arrangement to provide the flow control from the water heater. This provides a compact arrangement with a low component count and simple control mechanism. It also enables all valve mechanisms to be outside the water or steam flow.

15 Claims, 5 Drawing Sheets

(51) Int. Cl.
    *A47J 31/42*     (2006.01)
    *A47J 31/44*     (2006.01)
(58) Field of Classification Search
    USPC ........................................................ 99/302 P
    See application file for complete search history.

(56) References Cited

FOREIGN PATENT DOCUMENTS

| | | |
|---|---|---|
| EP | 2062512 A1 | 5/2009 |
| EP | 2067423 A2 | 6/2009 |
| EP | 2098146 A1 | 9/2009 |
| EP | 2807961 A1 | 12/2014 |
| WO | 2017063784 A1 | 4/2017 |
| WO | 2018122055 A1 | 7/2018 |

OTHER PUBLICATIONS

International Search Report and Written Opinion issued in connection with corresponding PCT Application No. PCT/EP2019/084304 dated Feb. 12, 2020.

* cited by examiner

COFFEE MACHINE WITH INTEGRATED STEAM AND HOT WATER GENERATION

CROSS-REFERENCE TO RELATED APPLICATIONS

The present application is a U.S. National Phase application under 35 U.S.C. § 371 of International Application No. PCT/EP2019/084304, filed on Dec. 10, 2019, which claims the benefit of European Patent Application No. 18212998.1, filed on Dec. 17, 2018. These applications are hereby incorporated by reference herein.

FIELD OF THE INVENTION

This invention relates to coffee machines, and in particular coffee machines which generate hot water for coffee brewing and steam for heating and/or frothing milk.

BACKGROUND OF THE INVENTION

Typically, full automatic espresso appliances provide the function of automated cappuccino brewing. In most cases, steam is used for heating and frothing the milk, in a similar manner to a barista.

In a first type of device, a milk frothing unit is connected outside the appliance to an interface that supplies steam out of the appliance to the milk frothing unit. The milk frothing unit is then positioned outside the main appliance and is thus removable from the main appliance, to improve the ease of cleaning. In particular, all parts in contact with milk need to be cleaned.

The input to the milk frothing unit receives steam, and delivers this to milk stored in the milk frothing unit. This avoids the steam interface becoming contaminated with milk, so that only the milk frothing unit needs to be cleaned after each use rather than any part of the appliance itself. The steam outlet is then typically integrated in a socket-like interface in the housing of the device and the milk frothing unit is plugged into this interface.

In a second type of device, milk frothing is achieved with a so-called cappuccinatore, which is a frothing tube that is inserted by a consumer into a container of milk.

In all these coffee machines, there may be a single water heater, which is able to heat to a sufficient temperature to generate steam for the milk heating and frothing function and water for the coffee brewing function. Various valves and flow paths are needed to combine the different functions, such as a valve to control the flow to the brew chamber, a valve to control a discharge flow and a valve to control steam flow. These flow path couplings and control valves introduce significant cost. Traditionally, the water and steam supply systems are formed using standard off-the-shelf components such as electronic valves, passive over-pressure valves, junctions, hoses and hose connections. The level of integration of functionality is therefore limited and the hydraulic circuits are quite extensive.

This approach results in a relatively high hydraulic circuit complexity.

Conventional valves use springs to open or close, use cams to drive the valve, or use a combination of both. Some or all of these components are located in the hot water or steam flow. They may therefore be exposed to lime scale, potentially leading to functional failure of the valve or increased turbulence to the flow.

EP 2 062 512 discloses a coffee machine in which the three main valve functions are implemented by a valve block which essentially comprises the parallel combination of three independent valves. This reduces the amount of pipework needed and provides a more compact system, but it still has duplication of parts and many different components to make up the valve system.

EP 0 232 460 discloses a coffee machine with a multi-way valve, in particular a disc type ceramic valve which routes a hot water/steam flow to a selected outlet, based on a rotational position of the valve.

There is a need for a coffee machine design which provides a low cost and compact valve arrangement for controlling the various hot water and steam flow paths within the machine.

SUMMARY OF THE INVENTION

The invention is defined by the claims.

According to examples in accordance with an aspect of the invention, there is provided a coffee machine comprising:
  a water supply;
  a water heater for heating water to generate steam and hot water, and having a water heater outlet;
  a pump for pumping the heated water and steam;
  a steam delivery nozzle;
  a brew chamber for brewing coffee with hot water; and
  a valve arrangement for controlling the coupling of the water heater outlet selectively to the steam delivery nozzle and the brew chamber,
  wherein the valve arrangement comprises:
  an inlet channel coupled to the water heater outlet;
  two or more outlets;
  an active valve between the inlet channel and a first one of the outlets;
  a passive valve between the inlet channel and a second one of the outlets; and
  a cam surface for controlling an open or closed setting of the active valve, such that the angular position of the cam surface controls the coupling of the inlet channel to the first one of the outlets, and wherein the passive valve is permanently connected between the inlet channel and the second one of the outlets.

This coffee machine design makes use of a single valve arrangement to provide the flow control from the water heater. A single inlet channel (for steam and hot water) connects to the required outlets using a rotatable cam. This provides a compact arrangement with a low component count. The setting of the valve is achieved simply by rotating the cam, and the water or steam at the inlet channel is then routed to the desired outlet.

Preferably, rotation of the routing element is done through the same motor that drives the brew chamber between its different positions. Thus, there is no need for additional driving means. This again provides a compact arrangement, with a low component count, that can easily fit into the confined space of the coffee machine.

The first one of the outlets may be a steam outlet and the second one of the outlets may be a brew chamber outlet. When the steam outlet is opened by the active valve, the pressure drop caused by opening the steam outlet means the passive valve is automatically closed, preventing fluid flow to the brew chamber. Thus, only one actively controlled valve is needed. In particular, the active valve control only needs to open or close the active valve, rather than providing reconfiguration of channel pathways. Note that the steam outlet may serve to deliver steam or hot water, as desired by the user.

The coffee machine may further comprise a water collection outlet. However, this does not need to be an output of the valve arrangement itself. For example, the brew chamber outlet may selectively couple to the brew chamber or to the water collection outlet depending on the position of the brew chamber. Thus, the valve arrangement only needs one input and two outputs.

The active valve may comprise a valve pin for opening or closing an opening between the inlet channel and the first one of the outlets, wherein the valve pin is coupled to the cam surface. The valve pin for example has a valve seat at its end which simply opens or closes the opening.

The valve pin for example passes through an exterior opening (of the valve casing), wherein the valve control mechanism is all outside the exterior opening. Thus, all valve control parts are outside the flow, and only the sliding valve pin is in the flow (of steam).

The passive valve for example comprises a diaphragm valve, wherein the diaphragm has a fluid side and a dry side, wherein the valve mechanism is on the dry side. Thus, all valve control parts are again outside the flow.

The motor for example has an output shaft which couples (directly or indirectly) to a main cog which controls the movement of the brew chamber, for example between a home position (in which coffee grinds are received, and therefore hereinafter also referred to as ground coffee receiving position), an intermediate position and a brew position. The valve setting may also be controlled by coupling to that main cog, although other couplings are possible.

An output shaft of the brew chamber motor or any gear forming part of the drivetrain of the motor may be used to control the valve setting.

When in the home or ground coffee receiving position, the valve couples the inlet channel to the brew chamber outlet via the passive valve. In addition, the position of the brew chamber is such that the brew chamber outlet is coupled to the water collection outlet. Thus, if any water should pass the passive valve, it is routed to the water collection outlet.

When in the brew position, the valve again couples the inlet channel to the brew chamber outlet via the passive valve. In addition, the position of the brew chamber is such that the brew chamber outlet is then coupled to the brew chamber. Thus, when sufficient pressure is present by means of the pump, hot water is routed to the brew chamber.

When between the home position and the brew position, the valve is for example controlled to couple the inlet channel to the steam outlet for enabling milk heating and/or frothing.

The water collection outlet is for example coupled to a drip tray.

The valve arrangement may be mounted onto or in close proximity to the water heater, with its inlet channel directly coupled to the water heater outlet, without intermediate hoses.

The coffee machine may comprise a bean-to-cup espresso machine, which then further comprises a bean grinder, and a ground bean compressor.

BRIEF DESCRIPTION OF THE DRAWINGS

Examples of the invention will now be described in detail with reference to the accompanying drawings, in which.

DETAILED DESCRIPTION OF THE EMBODIMENTS

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figs are merely schematic and are not drawn to scale. It should also be understood that the same reference numerals are used throughout the Figs to indicate the same or similar parts.

The invention provides a coffee machine which makes use of a valve arrangement for controlling the coupling of a water heater outlet selectively to one of two or more outlets, such as a steam delivery nozzle and a brew chamber. The valve arrangement comprises an active valve between the inlet channel and a first one of the outlets and a passive valve downstream of the active valve from the water heater outlet, coupled to a second one of the outlets. A cam surface controls the active valve, wherein the angular position of the cam surface controls the coupling of the inlet channel to the first one of the outlets. The rotation may be driven by a motor. Preferably, the rotation is driven by rotational coupling to the brew chamber motor. This coffee machine design makes use of a single valve arrangement to provide the flow control from the water heater.

This provides a compact arrangement with a low component count and simple control mechanism. It also enables all valve mechanisms to be outside the water or steam flow.

Figure 1:
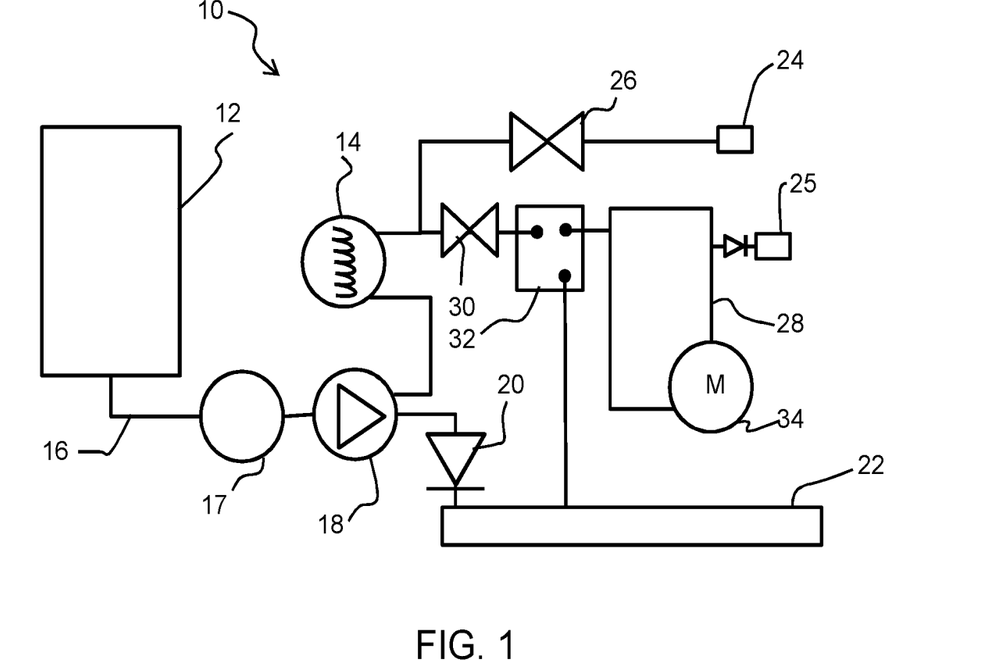
FIG. 1 shows the components of a known full function espresso coffee machine, and in particular shows the fluid paths in the system.

FIG. 1 shows the components of a known full function espresso coffee machine, and in particular shows the fluid paths in the system.

The coffee machine 10 comprises a water container 12, a water heater 14 for heating water to generate steam and hot water and having a water heater outlet, and a water pump 18 for pumping the heated water and steam. There is additionally a water dosing flow meter 17.

The pump delivers water to the heater 14. In addition, there is an over-pressure valve 20 from the heater to a water collection unit 22 for collection or discharge of waste water in the form of a drip tray.

The heated steam is provided to a steam delivery nozzle 24 through a first electronic valve 26. There is a coffee delivery nozzle 25 with an in-line crema valve. The heated water is provided to a brew chamber 28 through a second valve 30 and also through a control unit 32. The control unit 32 allows water to be discharged to the water collection unit 22 for example during cooling down of the heater. Its function is described further below.

The brew chamber 28 is driven by a motor 34 for driving the brew chamber between different positions. These positions include at least a ground coffee receiving position and a coffee brew position.

The coffee machine makes use of single heater 14 to selectively supply hot water of about 100° C. for brewing coffee, and steam of about 140° C. (or more) for heating and/or frothing milk.

The machine may have a pressurizing system for the brew chamber. It may further have a reservoir for receiving coffee beans and a grinder, so that a full bean-to-cup function is provided. Alternatively, the ground coffee may be supplied in a capsule, pod or the like pre-portioned provision. These elements are not shown as they do not relate to the hydraulic components.

An espresso coffee is typically made by forcing pressurized water to flow through a quantity of coffee grind. The brewing chamber is for example removably arranged in order to facilitate emptying and cleaning of the brewing chamber.

During an espresso making process, the coffee grind may be compressed to a certain extent. To this end, the machine may for example comprise a piston, which is movably arranged in a cylindrical brewing chamber, and which is capable of sealing an open top side of the brewing chamber.

Movement of the piston controls the extent of compression of the coffee grind. When the coffee grind is compressed more and more, a flow through resistance of the coffee grind increases. During an espresso making process, a brewing pressure at which the process is performed, i.e. a pressure at which the water is conducted through the coffee grind, is determined by the flow through resistance of the coffee grind.

The brewing pressure is a determining factor for important characteristics of the espresso drink, including the taste, and the texture of a foam layer. The brewing pressure is thus for example controlled by varying a position of the piston and/or the water flow.

The operation of the machine in generating an espresso coffee drink is entirely conventional, and the general operation of the coffee machine will not be described in detail. Instead, only details relating to the control of flow through the machine will be explained. Furthermore, this full function espresso machine is only one example of the type of coffee machine to which the invention may be applied.

When the machine is to prepare a milk-based coffee, the heater 14 is first heated up to about 140° C. (or more) to supply steam to heat and/or froth milk. The heater is then cooled down to about 100° C. to provide hot water for brewing coffee. During the cooling down phase from 140 to 100° C., water coming from the heater may still be too hot for brewing coffee. This water is discharged to the water collection unit 22 by the control unit 32. For a coffee drink which does not require frothed milk, the heater may only be heated to 100° C. and the brewing will then start without delay.

The control unit 32 is a coupling between the valve 30 and the brewing chamber 28 but in dependence on the brew chamber position. Thus, this unit does not select between flow paths but instead it functions as a physical interrupt unit which allows or interrupts the connection between the valve 30 and the brew chamber 28.

When the brew chamber is in its home position (which is a rest position at which it is positioned for receiving coffee, e.g. from a grinder), the valve 30 is not connected to the brew chamber 28 so the brew chamber is not connected to the water supply system.

When the brew chamber is moved from the home position to the brew position, there is a control pin of the boiler which interfaces with the control unit 32, and this moves the valve 30 and configures the valve 30 to allow the fluid coupling. When the brew chamber is at its home position, the control unit, water is guided to the drip tray and when the brew chamber is in the brewing position, water is guided to the brew chamber.

The various valves used in the system are expensive and complex.

The invention instead provides a multivalve design to replace at least the two valves 26 and 30 discussed above.

Figure 2:
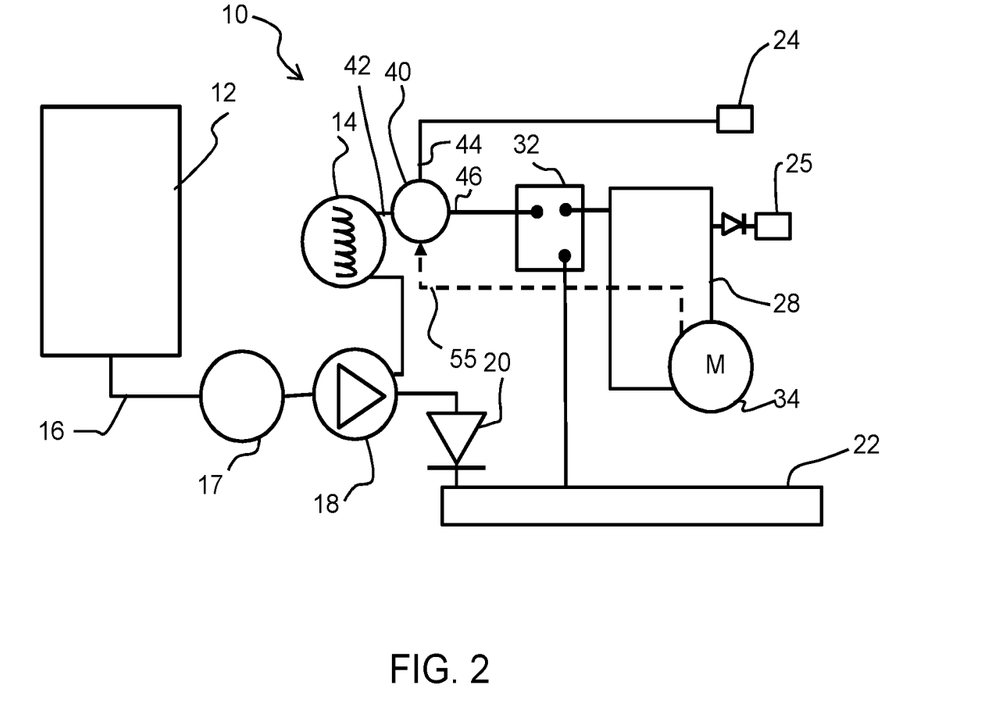
FIG. 2 shows the coffee machine arrangement in accordance with an example of the invention.

FIG. 2 shows the arrangement in accordance with an example of the invention. The same reference numbers are used as in FIG. 1 for the same components. It can be seen that the two valves mentioned above have been replaced by a valve arrangement 40 for controlling the coupling of the water heater outlet selectively to the steam delivery nozzle 24, and the brew chamber 28.

The over-pressure valve is shown as a separate component, as in FIG. 1, but this function may instead be integrated into the valve arrangement, as part of the passive valve function described below.

The valve arrangement comprises an inlet channel 42 coupled to the water heater outlet, a steam outlet 44 (which may also be used to provide hot water) and a brew chamber outlet 46.

Within the valve arrangement there is a rotatable cam, wherein the angular position of the cam controls the coupling of the inlet channel to one (or both) of the steam outlet and the brew chamber outlet. A rotational coupling 55 is provided between the cam and a motor, more particular the brew chamber motor.

A particular advantage of this arrangement, in addition to being less expensive and complex, is that it may be operated by the same motor and/or gear system that is used to drive the brew chamber between its various positions, i.e. its home position when the brew chamber is located to receive coffee, and its closed brew position.

Three different brew chamber positions may be defined:

A home position, in which the valve arrangement 40 and the control unit 32 is set to discharge water to the water collection unit 22;

A brew position in which the valve arrangement is set to direct water to the brew chamber; and An intermediate position in which the valve arrangement is set to direct steam or hot water to the steam delivery nozzle 24.

Figure 3:
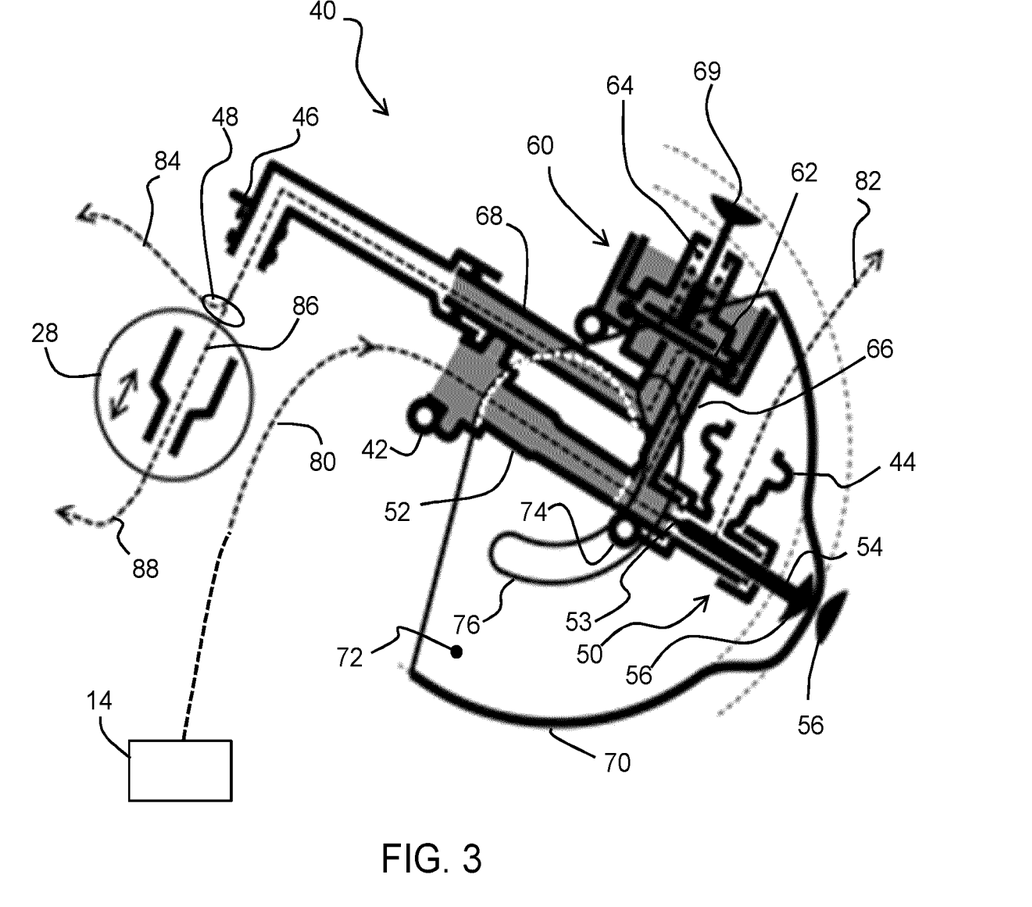
FIG. 3 shows an example of a valve arrangement in perspective view.

FIG. 3 shows an example of the valve arrangement 40.

The valve arrangement comprises an actively driven valve 50 ("active valve") and a passive valve 60.

The inlet channel 42 connects to the active valve 50 by an inlet pipe 52. The active valve 50 controls the coupling of the inlet channel 42 to the steam (and hot water) outlet 44. In particular, at the end of the inlet pipe 52 is an opening 53 which leads to the steam outlet. This opening is either open or closed depending on the setting of the active valve 50.

The active valve 50 has a valve pin 54 the inner end of which forms a valve seat. When the valve pin is moved outwardly, the opening 53 is open, and when the valve pin is pushed in, the opening 53 is closed by the valve seat at the end of the valve pin.

The active valve 50 comprises a drive head 56 at the outer end of the valve pin. A cam surface 70 is shaped to control the movement of valve pin 54 by engaging with the drive head 56. The cam surface 70 is the outer periphery of a rotatable disc 72. The cam surface extends radially outside the valve arrangement. It is outside the body of the valve arrangement and thus provides external control of the valve arrangement by engaging with the drive head. The disc 72 for example has a flange which extends perpendicularly to the plane of the disc, and the drive head rides along this flange when the cam disc rotates. The disc rotates by coupling to the brew chamber motor. The rotation of the rotatable disc is guided by a pin 74 and slot 76 arrangement.

The valve pin passes through an exterior opening of the valve casing. The valve control mechanism (i.e. the cam) is all outside the exterior opening. Thus, there are no springs or other components in the flow.

The cam surface is used both to push in and pull out the valve pin 54, by having a fixed coupling between the drive head 56 and the cam surface. For example, the drive head may sit in a channel of the cam surface so that it can be both pushed and pulled into position. An alternative is for the valve pin to be biased outwardly by a spring so that the cam surface only needs to push the valve pin inwardly. In such a case, there is no need for a fixed coupling between them. The spring will in this case be outside the flow path.

The passive valve comprises a diaphragm 62 which is biased into a closed state by a spring 64. In the closed state, the passive valve 60 blocks the connection between an inlet 66 which connects to the inlet channel 42 and an outlet 68 which connects to the brew chamber outlet 46. When the pressure is high enough, the valve will open.

The passive valve has a control knob 69. The control knob 69 allows the valve to be forced open by pulling the knob radially outwardly. This happens when the disc 72 is in the correct position, in particular rotated by around 90 degrees anticlockwise compared to the position shown in FIG. 3. The radially enlarged portion which engages the drive head 56 in the position shown in FIG. 3 then engages the underside of the control knob 69. This allows water to flow to the outlet 48 even in the absence of a high pressure.

This feature may be used to enable removal of leftover (cold) water in the valve, before steam is generated. This prevents a cold initial splash of water from the steam outlet 44.

The diaphragm 62 has a fluid side and a dry side, and the valve mechanism is all on the dry side.

Thus, the important functional components of both valves, i.e. the entire valve arrangement, are outside of the water or steam flow, thereby increasing the lifetime robustness of the valve construction and function.

The inlet channel 42 is coupled to the passive valve 60 near to the steam (and hot water) outlet 44, so that the inlet 66 may be considered to be downstream of the active valve in the sense that the flow to the inlet 66 generally passes the first outlet 44. The passive valve is thus generally downstream of the active valve, in that the flow is able to escape from the first outlet rather than proceeding further to the passive valve. Thus, when the active valve 50 is open, the path of least flow resistance is to the steam (and hot water) outlet 44. The inlet channel 42 may be fluidly coupled to both valves, but the passive valve will close during steam delivery so that the valve arrangement as a whole is above to control the flow to either the steam outlet or the brew chamber outlet 46.

The passive valve is opened when there is sufficient pressure at the inlet channel, which is for example created by operation of the pump 18. When the pump is operated, the brew chamber is pressurized and the valve stays open until the brewing is ended and the pump is stopped.

When the valve pin 54 is pushed in, the coupling to the steam (and hot water) outlet 44 is closed off.

During an initial heating stage for coffee brewing, the pressure generated is insufficient to open the passive valve 60. The water volume is contained so that correct dosing volumes can be controlled.

During brewing, the pump is powered fully on, generating sufficient pressure to open the passive valve 60, and with the brewing chamber connected, water is directed to the brewing chamber.

During a heating stage for steam generation, the steam pressure may open the passive valve 60 while the active valve is still closed (i.e. before steam delivery). With the brewing chamber 28 not connected at this time, any water is ditched into the water collection unit 22 (drip tray) via the water collection outlet 48, before steaming.

During steaming, with the valve pin out, the pump is driven intermittently to create a lower water flow and a lower pressure. The heater is set to a higher temperature for steam creation than during brewing. The pressure stays below the opening pressure of the passive valve 60 so that the steam is delivered to the steam (and hot water) outlet 44.

During cooling down after steaming (with the active valve closed), if the pump is on, the pressure will open the passive valve 60, and again with the brewing chamber 28 not connected, the water is ditched into the drip tray. This may take place while the water temperature is cooling down from the previous 140° C. temperature to the desired temperature of around 100° C. (e.g. 96 ° C.). This takes some time because the heating block is hot and only holds a limited amount of water. Pumping cold water through the heating block provides active, and therefore more rapid, cooling, so that the final steam volume and some hot water is routed to the drip tray, by a valve.

The brew chamber 28 is a moving component, which is moved between different positions including at least a ground coffee receiving position and a coffee brew position.

In the coffee brew position, the brew chamber outlet 46 is coupled to the brew chamber 28. A coupling between the brew chamber outlet 46 and the water collection outlet (which leads to the drip tray) is closed off. In the ground coffee receiving position (or other positions), the brew chamber outlet 46 is coupled to the brew chamber 28. A coupling between the brew chamber outlet 46 and the water collection outlet (which leads to the drip tray) is opened. Thus, movement of the brew chamber 28 controls the coupling of the brew chamber outlet either to the drip tray or to the brew chamber. This movement is implemented by the control unit 32.

FIG. 3 shows various flow paths, including a flow path 80 of heated water or steam from the heater 14, a steam path 82 for milk frothing, a flow path 84 to the drip tray and a flow path 86 to the brew chamber 28 and a coffee flow 88.

Figure 4:
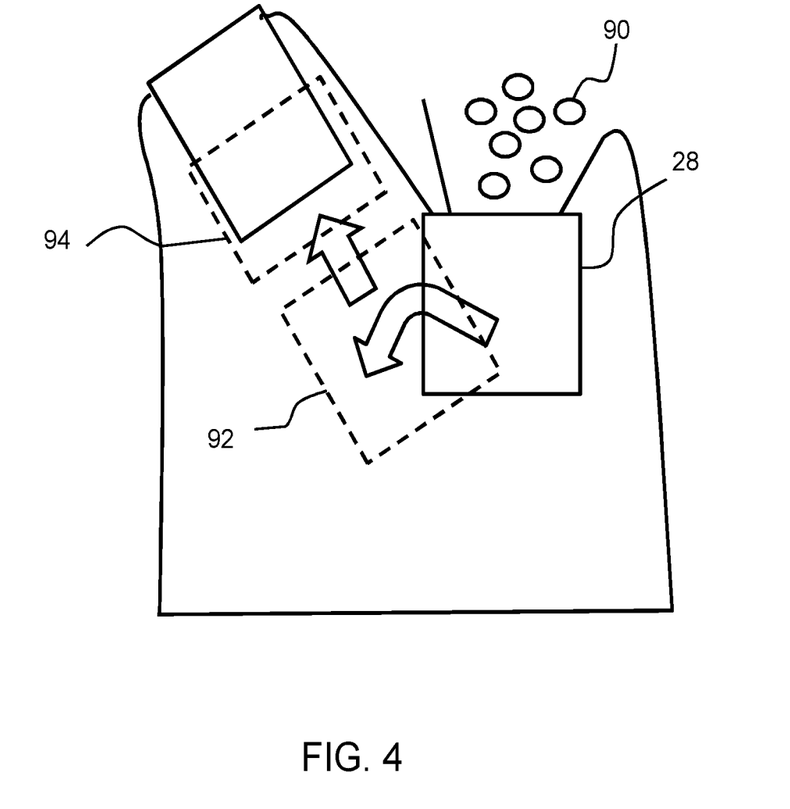
FIG. 4 shows schematically positions of the brew chamber.

FIG. 4 shows schematically the different brew chamber positions. The brew chamber 28 is shown in a home position in which it can receive ground coffee 90, e.g. in a pod or capsule or, as illustrated, from a grinder. Thus, this is the position in which supply of coffee grinds takes place. This position of the brew chamber 28 is detected by a switch 106 (FIG. 5).

The brew chamber is driven to an intermediate position 92 and finally to a brew position 94. In this brew position 94, compression of the coffee grinds may take place as part of the brewing process, and extracted coffee is delivered to the coffee delivery nozzle 25.

Figure 5:
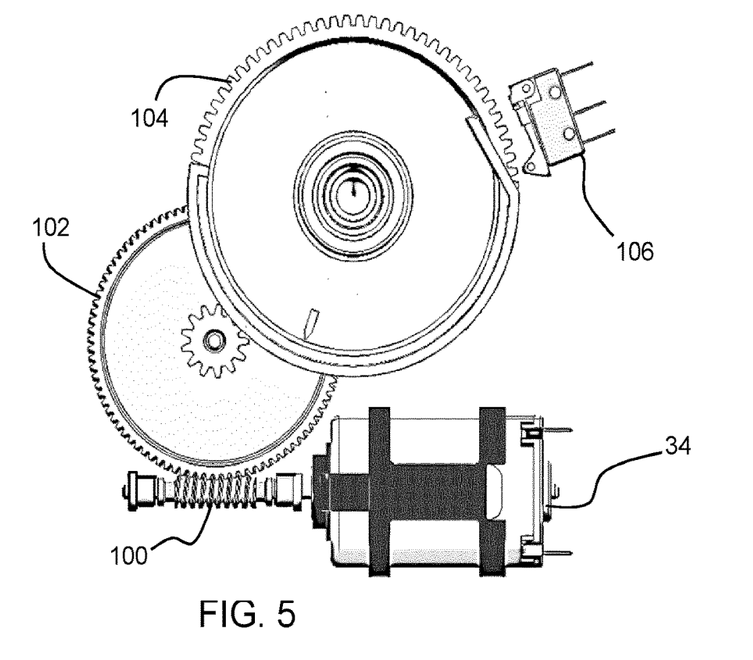
FIG. 5 shows one example of motor arrangement in side view.

FIG. 5 shows the motor 34 having an output shaft 100 in the form of a worm wheel. This engages with a first cog 102 which then drives a main cog 104 which controls the movement of the brew chamber 28 between the two end positions (the home position and the brew position). The main cog is associated with the detection switch 106 which detects particular angular orientations of the main cog. These corresponds to particular brew chamber positions.

Figure 6:
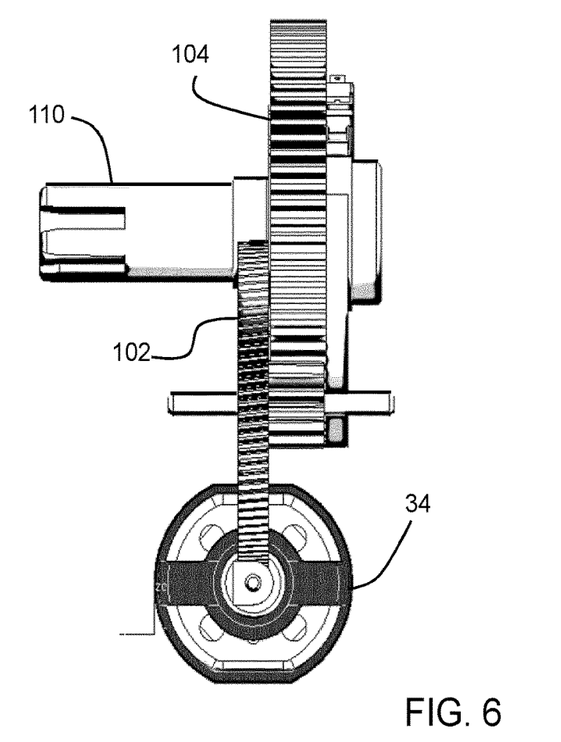
FIG. 6 shows the motor arrangement of FIG. 5 in end view.

FIG. 6 shows the arrangement of FIG. 5 in end view. The main cog 104 drives a main control shaft 110 which extends along the axis of rotation and controls the brew chamber movement.

The switch 106 is also used to detect when the brew chamber is in the brew position. Thus, there is feedback to ensure the brew chamber follows a known range of movement. There is also detection of the intermediate position, which as explained above is used to set the valve arrangement to direct steam to the steam delivery nozzle.

Detection of this intermediate position may for example be achieved by means of timing. Optionally, this timing may be calibrated every time the machine is switched on, by measuring the time it takes to travel between the two extreme positions and averaging this value over the last 3 measurements or so. Alternatively, a second position detection switch may be used. In another option, a middle position marker may be used that acts on the existing single switch.

Figure 7:
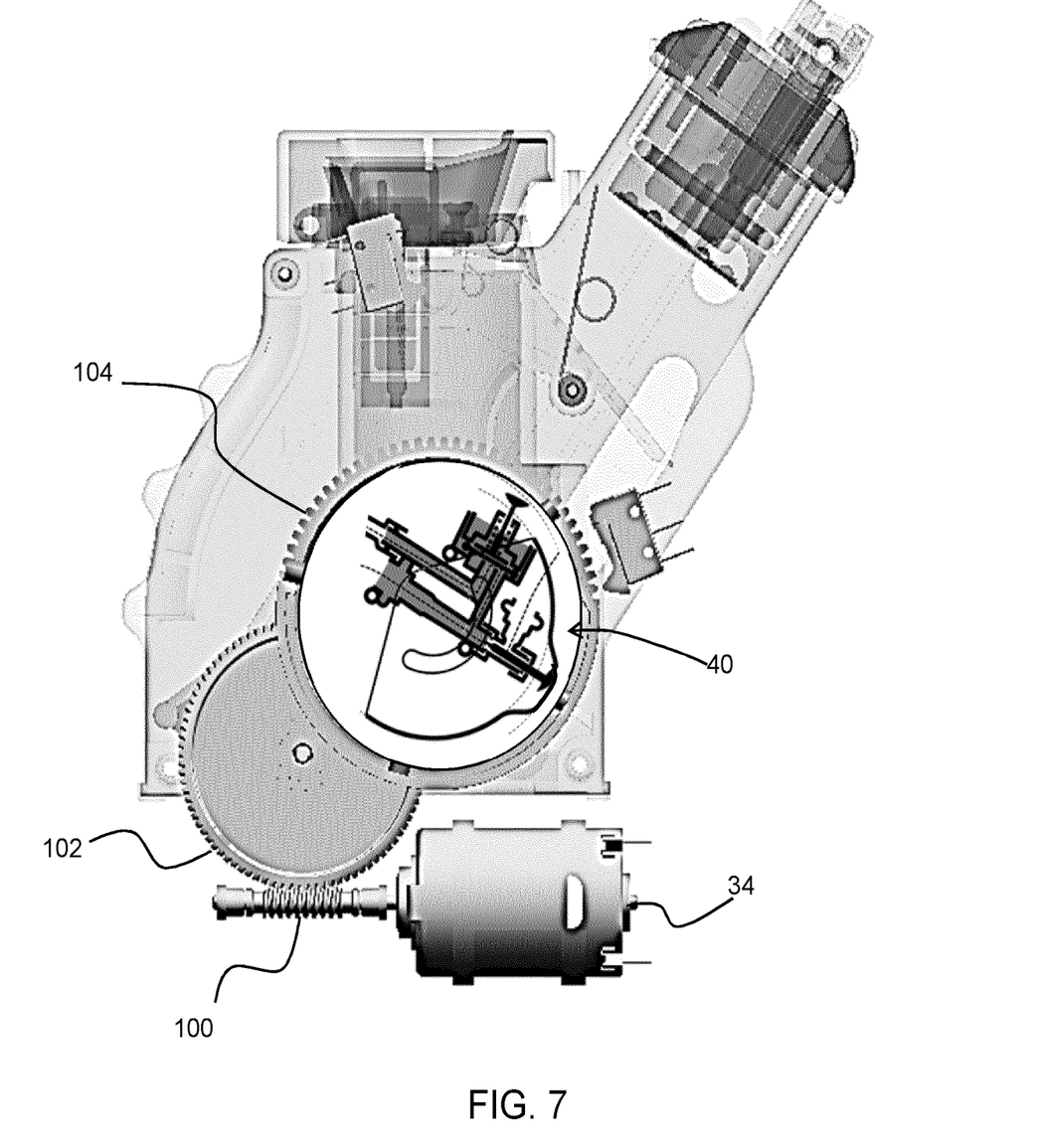
FIG. 7 shows the combination of the valve control with the brew chamber driving gearing.

The valve arrangement 40 may be controlled based on rotation of the main cog 104. Indeed, the valve arrangement 40 may be mounted over the main cog 104 as shown schematically in FIG. 7. Thus, there is a coupling between the valve and the brew chamber drivetrain directly from the main (rotating) brew chamber control shaft 110 and its associated main cog. There may instead be gearing between the brew chamber control shaft 110 and the valve controller. The valve may instead be controlled by a separate rotational coupling to the motor worm gear 100.

As explained above, the steam output is typically used for heating and/or frothing milk. A milk frothing unit may be part of the overall machine. Such unit may comprise a vessel for receiving milk, a steam input for receiving steam and a frothed milk output. The milk frothing unit may further comprise a steam channel which receives the steam flow, and a milk channel that may draw milk from the vessel by pressure differences based on a Venturi effect generated by the steam channel. Furthermore, a mixing chamber may be provided, for mixing the steam and milk and optionally air that may be drawn into the mixing chamber by a similar Venturi effect. The design and operation of a milk frothing unit is conventional. Further details of the milk frothing unit are thus not provided.

The coffee maker may comprise any suitable type of water heater for heating the water, for example a thermoblock or through flow heater.

The invention is of particular interest to fully automatic coffee machines that create a coffee beverage by automatically grinding coffee beans, compressing the coffee, and pumping hot pressurized water through the coffee. Furthermore, such coffee machines have the possibility to create milk-based beverages by frothing milk by means of steam. These machines are known as full function bean-to-cup espresso machines. However, the invention can be applied generally to any drinks machine which has both hot water generation and steam output, using a shared heater, and for example with the steam being used for milk frothing.

For example, the invention may be applied to a capsule or pod-based system which receives pre-compressed coffee capsules or pods, or to a machine which receives pre-ground coffee.

The machine may have an internal or external water reservoir or may be plumbed in.

In the example described above, the intermediate position of the valve (i.e. the pin 74 in the middle of the slot 76) is used for frothing. However, the order of outlet positions may be different.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A coffee machine comprising:
a water supply;
a water heater for heating water to generate steam and hot water, and having a water heater outlet;
a pump for pumping the hot water and the steam;
a steam delivery nozzle;
a brew chamber for brewing coffee with the hot water; and
a valve arrangement for controlling a coupling of the water heater outlet selectively to the steam delivery nozzle and the brew chamber,
wherein the valve arrangement comprises:
an inlet channel coupled to the water heater outlet;
two or more outlets; and
an active valve between the inlet channel and a first outlet of the two or more outlets,
and wherein the valve arrangement further comprises:
a passive valve between the inlet channel and a second outlet of the two or more outlets, wherein the passive valve is downstream of the active valve; and
a cam surface for controlling an open or closed setting of only the active valve, such that an angular position of the cam surface controls a coupling of the inlet channel to the first outlet, and wherein the passive valve is permanently connected between the inlet channel and the second outlet.

2. The coffee machine as claimed in claim 1, further comprising a motor for driving the brew chamber between different positions including at least a ground coffee receiving position and a brew position, and
a rotational coupling between the motor and the cam surface.

3. The coffee machine as claimed in claim 2, wherein the motor comprises an output shaft coupled to a main cog, and wherein the main cog controls a movement of the brew chamber between at least the ground coffee receiving position and the brew position.

4. The coffee machine as claimed in claim 3, wherein the main cog is associated with a detection switch which detects particular angular orientations of the main cog that correspond to particular brew chamber positions.

5. The coffee machine as claimed in claim 3, wherein the valve arrangement is controlled based on a rotation of the main cog.

6. The coffee machine as claimed in claim 1, wherein the first outlet is a steam outlet and the second outlet is a brew chamber outlet.

7. The coffee machine as claimed in claim 6, further comprising a water collection outlet.

8. The coffee machine as claimed in claim 7, wherein the brew chamber outlet is selectively coupled to the brew chamber or to the water collection outlet depending on a position of the brew chamber.

9. A coffee machine as claimed in claim 8, wherein the active valve comprises a valve pin for opening or closing an opening between the inlet channel and the first outlet, and wherein the valve pin is coupled to the cam surface.

10. The coffee machine as claimed in claim 9, wherein the valve pin passes through an exterior casing opening, and wherein a valve control mechanism is all outside the exterior casing opening.

11. The coffee machine as claimed in claim 9, wherein the active valve comprises a drive head, and wherein the cam surface is shaped to control a movement of the valve pin by engaging with the drive head.

12. The coffee machine as claimed in claim 7, further comprising a drip tray connected to the water collection outlet.

13. The coffee machine as claimed in claim 1, wherein the passive valve comprises a diaphragm, wherein the diaphragm has a fluid side and a dry side, and wherein a valve mechanism of the passive valve is on the dry side.

14. The coffee machine as claimed in claim 13, wherein the diaphragm is biased into a closed state by a spring, and wherein the passive valve blocks a connection between an inlet, which connects to the inlet channel, and the second outlet.

15. The coffee machine as claimed in claim 1, further comprising a bean-to-cup espresso machine, which comprising comprises a bean grinder and a ground bean compressor.

\* \* \* \* \*